US006476951B1

(12) United States Patent
White

(10) Patent No.: US 6,476,951 B1
(45) Date of Patent: Nov. 5, 2002

(54) USE OF MODE COUPLED OPTICAL FIBER IN COMMUNICATIONS SYSTEMS

(75) Inventor: Whitney R. White, Summit, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/396,826

(22) Filed: Sep. 14, 1999

(51) Int. Cl.[7] .............................................. H04B 10/12
(52) U.S. Cl. ......................... 359/173; 385/28; 385/123
(58) Field of Search ................................ 359/173, 161; 385/28, 123, 124

(56) References Cited

U.S. PATENT DOCUMENTS

| | | | | |
|---|---|---|---|---|
| 4,006,962 A | * | 2/1977 | Olshansky | 385/28 |
| 4,366,565 A | * | 12/1982 | Herskowitz | 359/116 |
| 4,854,706 A | * | 8/1989 | Claus et al. | 356/345 |
| 5,862,287 A | * | 1/1999 | Stock et al. | 385/123 |
| 5,963,349 A | * | 10/1999 | Norte | 359/116 |
| 6,094,291 A | * | 7/2000 | Kashyap | 359/245 |

OTHER PUBLICATIONS

"Specifications", IEEE 802.3z Gigabit Ethernet, Jul. 1998, p. 5.
"International Standard," IEC 825–1, First Edition; Jul. 17, 1998, pp. 95, 102–113.
"Theory of Dielectric Optical Waveguides," by Dietrich Marcuse, 1991, pp. 231–241.
"Advantage of POF WDM System Design," by Jun–ichi Mizusawa, International POF Conference '99, Jul. 14, 1999, pp. 31–35.
"Squeezing more bandwidth into high NA POF," by D. Kalymnios, International POF Conference '99, Jul. 14, 1999, pp. 18–24.
"Exploring the Use of GIPOF Systems in the 640 nm to 1300 nm Wavelength Area," by G. D. Khoe, International POF Conference '99, Jul. 14, 1999, pp. 36–43.

* cited by examiner

Primary Examiner—John Tweel
(74) Attorney, Agent, or Firm—Steve Mendelsohn

(57) ABSTRACT

Mode-coupled plastic or glass optical fibers are used in communications systems to carry optical signals between transmitters and receivers. In order to overcome the high attenuation characteristics of mode-coupled optical fibers, the launch power used to transmit signals over the optical links is higher than those typically used in comparable conventional communications systems that rely on standard single-mode or multimode glass optical fibers. In order to accommodate the larger launch power levels, the communications systems are designed with receivers having a larger dynamic range than those used in conventional communications systems. In addition, the mode-coupled optical fibers can have diameters on the order of 50–62.5 microns, or even larger, thereby enabling the use of relatively simple and inexpensive butt coupling between the fibers and other system components (e.g., transmitters and receivers).

24 Claims, 1 Drawing Sheet

USE OF MODE COUPLED OPTICAL FIBER IN COMMUNICATIONS SYSTEMS

BACKGROUND OF THE INVENTION

1. Field of the Invention

The present invention relates to fiber-optic communications systems, such as telecommunications systems and data communications systems.

2. Description of the Related Art

In today's marketplace, as the demand for high-rate communications systems continues to increase, commercial communications system designers continue to attempt to find cost savings and technological improvements in components, performance efficiencies, and transmission rates. To address these system goals, communications system designers have implemented designs and solutions using optical fiber as a transmission medium that exhibits high bandwidth and low transmission loss. Traditional fiber-optic communications systems exhibit superior data rates and demonstrate rapid recovery of capitalized costs. As used herein, the term "optical fiber" has its accustomed meaning of a fiber (e.g., a thin rod shape) containing one or more core regions within which light travels, and, in certain fabrications, a cladding layer outside of the outermost core region.

For decades, optical fiber has been the preferred transmission medium in high-capacity communications networks and long-distance communications systems. More recently, optical fiber has also begun to be used in short-distance communications applications, such as local area networks, integrated applications, and intra-system applications. In general, long-distance applications have communications links greater than about 1 km, while typical short-distance applications have communications links shorter than about 1 km, and often as short as tens of meters.

Typically, optical implementations of short-distance communications systems employ glass optical fiber that generally satisfies the desired physical and performance characteristics previously discussed. In particular, existing glass optical fiber exhibits low transmission losses, generally less than 1 dB/km. As used herein, the term "glass optical fiber" refers to any suitable silica-based fiber with or without optical doping impurities.

For example, a technically superior solution for making short-distance links is known to be based on single-mode glass optical fiber. This type of fiber offers exceptionally high bandwidth, since it supports only one propagating electromagnetic mode. Typically, the optical core of a single mode fiber is only several microns in diameter. Consequently, connecting to the optical core of the fibers requires precision optical and mechanical couplings that significantly increase the material and labor cost of the links.

Attempts to reduce the high costs associated with single-mode glass optical fiber systems include the approach of implementing links based on multimode glass optical fiber. Multimode glass optical fiber possesses a larger core diameter than single-mode fiber, generally in the range of approximately 50–62.5 microns. Thus, the mechanical and optical couplings required for multimode fiber connections are generally less precise, and therefore less expensive to manufacture and install, than those used for single mode fibers. However, the resulting bandwidth of multimode fiber is degraded by dispersion of the various electromagnetic modes which propagate in the fiber. While fiber manufacturers attempt to fabricate multimode fibers with an index profile that minimizes this intermodal dispersion, manufacturing limitations often result in non-ideal index profiles and associated degradation of bandwidth.

To further reduce the cost of optical links, the prior art also includes the use of multimode plastic optical fiber. Since plastic is less brittle than glass, plastic fibers can have significantly larger cores than multimode glass fiber, thereby allowing even further relaxation in the mechanical and optical tolerances of couplings at fiber endpoints. These relaxed tolerances further lower the cost of the optical transceivers and couplings in the links. Also, since methods exist to terminate plastic fiber endfaces with very little skill and effort, the cost required to install plastic fiber links may also be lower than comparable links using glass fibers. Although multimode plastic fibers offer simplicity and lower cost, serious limitations exist in the technologies for fabricating these fibers. As a result, plastic fibers are usually produced with either a step refractive index profile or a graded refractive index profile that differs significantly from that required for maximum bandwidth.

One way to overcome the bandwidth limitations of glass and plastic multimode fibers is to introduce nonuniformities during manufacture, such that power diffuses between one or more pairs of the electromagnetic modes of the fiber. The presence of such nonuniformities is referred to herein as "mode coupling." Mathematically, the diffusion of power between a pair of modes (labeled i and j) may be described with the differential equation $dP_j(x)/dx=C_{ij}P_i(x)$, where x is the spatial coordinate parallel to the fiber axis, $P_j(x)$ is the amount of power in the $j^{th}$ mode at point x, $P_i(x)$ is the amount of power in the $i^{th}$ mode at point x, and $C_{ij}$ is the coupling constant between modes i and j. A fiber of length L will be considered herein to be "mode coupled" if any of the coupling constants $C_{ij}$ are sufficiently large to produce a significant change in modal power distribution as an optical signal traverses the length of the fiber. A fiber that does not meet this condition is referred to herein as a "standard" multimode fiber. Since the coupling constants discussed above are often unknown in practice, a simpler, but less precise, definition of mode coupling strength will be introduced below. Note that a mode coupled fiber with a given set of coupling constants will cease to be mode coupled if it is cut to a sufficiently short length. By the same token, fiber that operates as a standard multimode fiber at one length will be mode coupled at a sufficiently long length.

In mode-coupled fibers, photons injected into the fiber sample many of the various electromagnetic modes while transiting the fiber. As a result, they arrive at the output end of the fiber with a narrower distribution of arrival times than they would in the absence of such mode coupling. The net result of this mode coupling is to reduce the effective intermodal dispersion of the multimode fiber, thereby increasing fiber bandwidth. This phenomenon has been well documented in both glass and plastic multimode optical fibers, and can be conveniently used to parameterize the strength of the mode coupling. Herein, if a multimode fiber has an index profile such that its monochromatic bandwidth would be $B_o$ in the absence of mode coupling, and if mode coupling acts to increase the observed monochromatic bandwidth to a value $B_c$, then the mode coupling will be said to be of strength $F=B_c/B_o$.

While mode coupling improves the bandwidth of multimode fibers, it also increases their attenuation compared to a comparable standard multimode fibers. Many types of mode coupling non-uniformities result in an additional loss that increases quadratically with mode coupling strength.

Mathematically, the excess loss $\alpha_c$ due to mode coupling is $\alpha_c = F^{2*}0.5$ dB/km.

While a significant body of prior art teaches methods for creating mode coupling in optical fibers, this knowledge has found little practical application, due to the increased loss that accompanies mode coupling. Historically, optical fibers were developed for use in long-distance links, where the large length scales involved made minimal fiber attenuation imperative. Since even a modest bandwidth improvement, say F=2, necessitated 2 dB/km excess loss, such fibers were not employed. In later years, when multimode optical fibers began to be significantly used for short-distance links, systems were designed with an assumption that the fiber medium would exhibit the very low losses achieved for long-distance transmission. Thus, existing link designs allow very little budget for attenuation in the optical fiber. Even with these low attenuation budgets, the maximum length of optical links using standard multimode fibers is usually limited by fiber dispersion, not by attenuation. Because existing short-distance systems allow very low budgets for fiber attenuation, designers have not contemplated short-range transmissions system using very heavily mode-coupled fiber. As a result, short-distance multimode optical transmission systems continue to be limited almost entirely by intermodal dispersion.

SUMMARY OF THE INVENTION

The present invention is directed to short-distance fiber-optic communications systems, where the systems are designed to use fibers with stronger mode coupling by recognizing and compensating for the generally differing and unique characteristics of such fibers in comparison to those of standard multimode optical fiber. Accordingly, these communications systems are configured to compensate for the shortcomings of mode-coupled optical fibers, while preserving their high bandwidth. More advantageously, such systems will also reduce the complexities (and associated costs) involved in the optical and mechanical couplings between active devices and optical fibers.

Primarily, the present invention provides communications systems using optical fibers with much stronger mode coupling and higher launched optical power when compared to existing systems using glass optical fibers. The present invention further provides these systems with a receiver having a greater dynamic range when compared to existing short-distance optical fiber systems. The present invention further provides for implementation of these systems based on mode-coupled fibers comprised of either plastic or glass. The present invention further provides that these fibers may have core diameters in the range of existing standard multimode optical fibers (approximately 50–62.5 microns), or more advantageously, may have significantly larger core diameters.

The present invention provides communications systems that utilize mode-coupled optical fibers at comparable or lesser expense than systems using standard multimode optical fiber. The present invention provides communications systems using mode-coupled optical fibers that provide for data communications at both high and low rates. In general, the fiber medium employed in the system is chosen to have a high degree of mode coupling, and the power coupled from an optical transmitter into the fiber is designed to be higher than an analogous system comprised of standard glass optical fiber. The increased launch power is proportionate to the loss budget allocation and overcomes the higher attenuation characteristics of the mode-coupled optical fiber. In addition, the dynamic range of the preamplifier portion of an optical receiver is chosen to be of a range proportionate to the launch power, such that saturation of the preamplifier does not occur. More advantageously, the spatial dependence of the dispersion characteristics of mode-coupled fiber is also exploited to achieve simplified optical and mechanical couplings compared to glass fiber systems.

The present invention may be implemented using mode-coupled optical fiber of either graded-index or step-index type, wherein the fibers are made from a glass, perfluorinated or substantially fluorinated plastic, or protonated plastic material.

In one embodiment, the present invention is a fiber-optic communications system having an optical link comprising (a) a transmitter; and (b) a receiver, coupled to receive optical signals transmitted by the transmitter over a mode-coupled optical fiber having a mode-coupling strength F of about 2 or greater. The transmitter is configured to transmit the optical signals at a launch power level that takes into account a fiber attenuation budget of about 5 dB or greater; and the receiver has a dynamic range that is selected based on the fiber attenuation budget.

BRIEF DESCRIPTION OF THE DRAWINGS

Other aspects, features, and advantages of the present invention will become more fully apparent from the following detailed description, the appended claims, and the accompanying drawings in which

DETAILED DESCRIPTION

Figure 1:
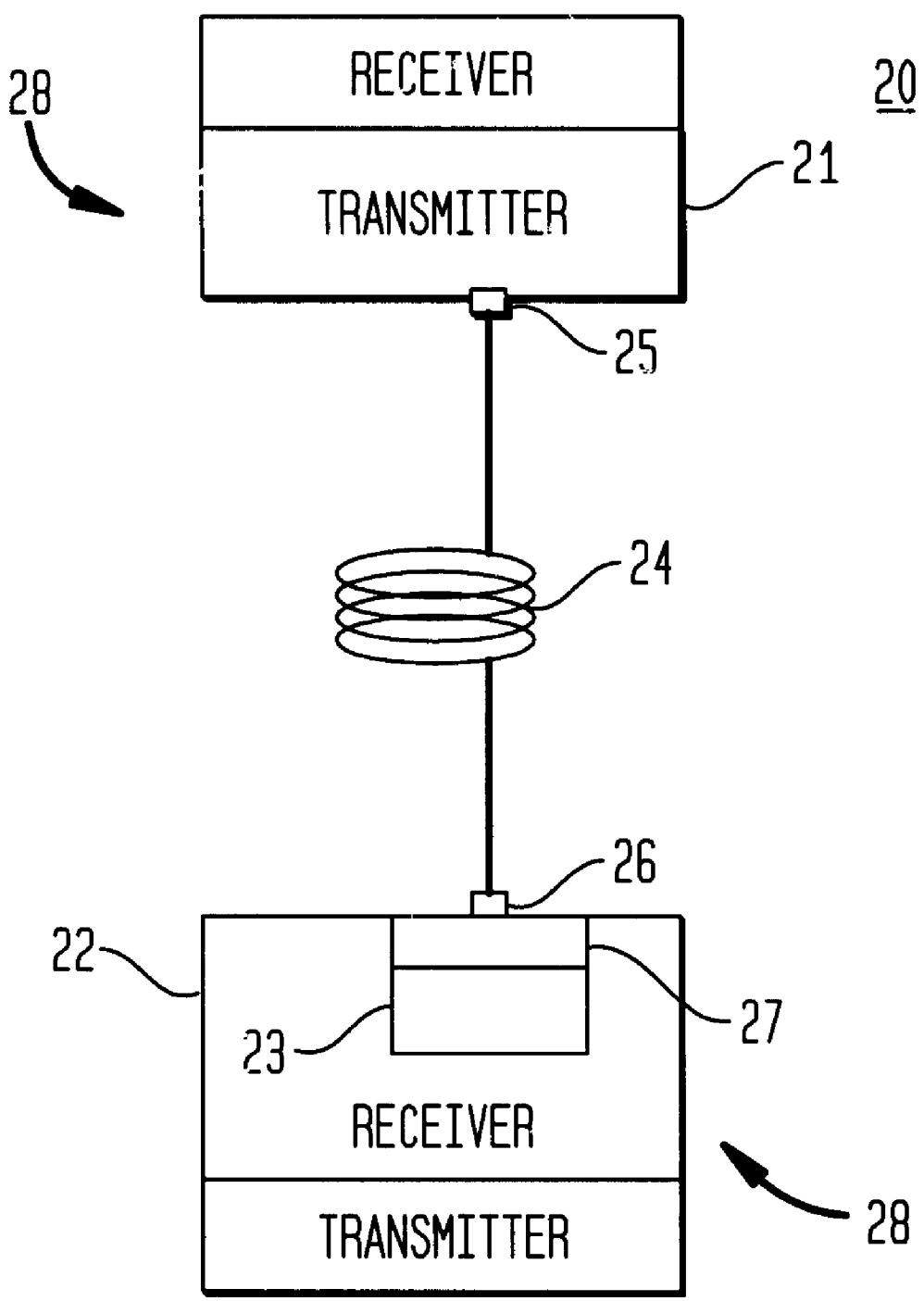
FIG. 1 depicts a schematic representation of an optical link for a fiber-optic communications system using mode-coupled optical fiber in accordance with one embodiment of the present invention.

The present invention provides a communication system design for short distance transmission that enables use of more strongly mode-coupled optical fiber by compensating for the relatively high attenuation exhibited by such fibers. In comparison to existing designs for short-distance multimode fiber systems, the present invention enables the use of less dispersive multimode fiber media, by greatly increasing the amount of fiber attenuation which can be tolerated, by increasing the amount of power injected from the transmitter into the mode-coupled fiber, and by increasing the dynamic range requirements of the receiver to prevent saturation of its internal preamplifier. This design philosophy differs from that of existing short-distance systems employing multimode fiber, since it incorporates a strongly mode-coupled fiber medium. As a result of using this alternative medium, the present invention recognizes a design trade-off, in which one may accept a requirement for a larger total power budget, in exchange for improvement of fiber dispersion characteristics. By contrast, existing short-distance multimode fiber systems are designed around standard multimode fiber, which is a low-loss, dispersion-limited medium. In such systems, no incentive exists for a higher power budget, since the additional power would allow no performance advantage. With the modifications presented herein, the present invention yields a transmission system based on multimode fiber that is strongly mode-coupled (F>2, as defined above), with a fiber attenuation budget of at least 5 dB, and usually as high as 15–25 dB, at all transmission speeds up to 12.5 Gb/s.

Introducing nonuniformities into a multimode fiber to create a "mode-coupled" fiber, causes power applied to the fiber to diffuse between the various modes of the fiber, including some modes that are not guided by the fiber. In the presence of mode coupling, photons injected into the fiber will each sample many of the various electromagnetic modes present in the fiber while traversing the fiber. Therefore, energy packets of the injected power will occupy different modes at different times in relation to their propagation down the fiber. With mode coupling, the energy packets in each mode effectively travel at an averaged group velocity. Hence, due to the samplings of the many modes in the mode-coupled fiber, the photons arrive at the output end of the fiber with a narrower distribution of arrival times as compared to photons in a comparable standard multimode glass fiber. The net result is that this mode coupling reduces the effective intermodal dispersion exhibited by the multimode fiber, thereby resulting in increased bandwidth. While this effect serves to increase bandwidth, it also increases attenuation.

Though the bandwidth of multimode fiber is improved with mode coupling, the greater attenuation characteristics, when compared to a similar fiber without mode coupling nonuniformities, greatly limit the applicability of mode-coupled fiber with existing transceiver designs. Since commercially available graded-index fibers almost always show negligible mode coupling over lengths of practical interest, little attention has been given to the possibilities of system designs employing mode-coupled fibers. In particular, since present commercial transceiver designs are based on the much lower attenuation characteristics of standard glass optical fibers, they will be incompatible with many types of mode-coupled fiber. The present invention, in contrast, provides transceiver designs which allow utilization of mode-coupled fibers in communications data systems over a greatly increased range of link lengths. Plastic optical fibers show significant mode-coupling on commercially important length scales (~10 meters).

In a system employing an ideal receiver with infinite dynamic range, the total power budget of the system P(ideal) would be given by the difference between the launch power and the sensitivity of the receiver. However, since real receivers have finite dynamic range R(d), and since it is imperative to operate the system in a manner that avoids saturation of the receiver preamplifier, the minimum allowed power may be greater than that set by the receiver sensitivity. Thus, for a real system, the total power budget will be given by the lesser of P(ideal) and R(d). Thus, for values of R(d) less than P(ideal), increasing the dynamic range of the receiver will increase the total power budget, and hence the fiber attenuation budget.

Typically, for communications systems employing fiber with a mode-coupling strength greater than or equal to about F=2 and a higher launch power, a fiber attenuation budget of at least 5 dB at transmission speeds of up to approximately 12.5 Gb/s can be achieved. Preferably, the fiber attenuation budget for these systems is in the range of approximately 15–25 dB. Faster receivers tend to be less sensitive, so fiber attenuation budgets tend to decrease with transmission speed. The purpose of the increased attenuation budget is to allow either more strongly mode-coupled fiber or longer link lengths.

As shown in FIG. 1, an optical link 20 of a fiber-optic communications system in accordance with one embodiment of the present invention, has a mode-coupled optical fiber 24 connected, at one end, to a connection 25 at the output side of a transmitter 21 and, at the other end, to a connection 26 at the input side of a receiver 22. In particular, the input side of receiver 22 comprises a photodetector 27 and a preamplifier 23. Transmitter 21 and receiver 22 are preferably both incorporated in monolithic transceivers 28, each capable of both receiving optical signals from an upstream source and transmitting optical signals to a downstream destination.

Launch power is transmitted from transmitter 21 into mode-coupled fiber 24 at connection 25. In comparison to a single-mode fiber, the mode-coupled optical fiber 24 has a much larger core diameter, in the range of approximately 50–62.5 microns or even larger. Thus, the high injected power required for this system design may be achieved with optical sources comparable to those used in existing single-mode fiber transceivers. The injected photons launched into the fiber pass through the connection 25 and traverse the fiber core 24. Within the fiber, the photons encounter the mode-coupling nonuniformities, sampling the various electromagnetic modes while transiting the fiber, which reduces the dispersion of their longitudinal propagation velocities. As a result, there is a narrower distribution of arrival times of photons at receiver 22 (i.e., reduced intermodal dispersion) resulting in improved bandwidth. On arrival at the receiver side, the photons pass through connection 26 connecting fiber 24 and the active area of photodetector 27. Photodetector 27 receives and converts the optical power to electrical current at a rate in accordance with the photoconductance of the photodetector and the gain of preamplifier 23. The higher the launch power, the larger the dynamic range of preamplifier 23 on receiver 22 to avoid the possibility that the preamplifier will become saturated due to the higher power transmitted.

Connections for the present invention, such as connections 25 and 26, enable fiber 24 to be connected with active areas of system components, other fibers, and active devices, such as transmitter 21 or receiver 22. Preferably, a simple connection method, such as a butt coupling, that does not require intermediate lenses is used, as opposed to those used for standard high-speed glass fibers. Mode-coupled fibers are especially compatible with this type of simple connection scheme, since the spatial dependence of their dispersion characteristics is typically relatively uniform near the center of the fiber core. In contrast, standard multimode fibers often exhibit large dispersive nonuniformities near the core center, necessitating careful control of the location of the optical input to achieve maximum bandwidth.

In general, in optical link 20, the mode-coupled optical fiber has a level of mode coupling of about F=2 or greater, the transmitter is configured to transmit the optical signals at a launch power level that takes into account a fiber attenuation budget of about 5 dB or greater, and the receiver has a dynamic range that is selected based on the fiber attenuation budget. In preferred implementations, the dynamic range of the receiver is 20 dB or greater, the transmitter is configured to transmit optical signals at a launch power level that takes into account a fiber attenuation budget of about 10 dB or greater, and the optical fiber is a mode-coupled graded-index perfluorinated plastic optical fiber that has a core diameter of less than about 150 microns and nonuniformities that contribute simultaneously to both the mode coupling and the high attenuation level of the optical fiber in order to trade off power for bandwidth in the system. In addition, the launch power level of the transmitter is greater than $S(\lambda)-G(\lambda)$ and less than $S(\lambda)$, where $\lambda$ is the wavelength (in nanometers) of light emitted by the transmitter. Here, $G(\lambda)$ is approximately 6 dBm for 550 nm<$\lambda$<1200 nm, and $G(\lambda)$ is approximately 10 dBm for 1200 nm<$\lambda$<1400 nm. Also, $S(\lambda)$ is given by the following formulas:

$S(\lambda) = -6.5$ dBm    $550\text{nm} < \lambda < 700$ nm $S(\lambda) = (-6.5 + 0.02(\lambda - 700))$ dBm    $700\text{ nm} < \lambda < 1050\text{ nm}$ $S(\lambda) = 0.44$ dBm    $1050\text{ nm} < \lambda < 1150\text{ nm}$ $S(\lambda) = (0.44 + 0.16(\lambda - 1150))$ dBm    $1150\text{ nm} < \lambda < 1200\text{ nm}$ $S(\lambda) = 9.47$ dBm    $1200\text{ nm} < \lambda < 1400\text{ nm}$ The upper limit is in accord with a widely recognized standard of eye safety (i.e., IEC 825-1). As such, at the certain wavelengths commonly used in short-distance transmissions (i.e., $\lambda=1300$ nm), the transmitter is configured to transmit the optical signals at a launch power level that is up to 20 dB higher than that required by typical communication protocols (e.g., the Gigabit ethernet standard) for a communications system having a standard optical fiber of approximately equal length.

Although the mode-coupled optical fiber used in the present invention is preferably a plastic optical fiber, mode-coupled glass optical fibers may alternatively be used in certain applications. Furthermore, the plastic or glass optical fiber is preferably a graded-index fiber, but may be also be a step-index mode-coupled fiber.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A fiber-optic communications system having an optical link comprising:
   (a) a transmitter; and
   (b) a receiver, coupled to receive optical signals transmitted by the transmitter over a mode-coupled optical fiber having a mode-coupling strength F of about 2 or greater, wherein:
      the transmitter is configured to transmit the optical signals at a launch power level that takes into account a fiber attenuation budget of about 5 dB or greater; and
      the receiver has a dynamic range that is selected based on the fiber attenuation budget.

2. The invention of claim 1, wherein the fiber attenuation budget is about 10 dB or greater.

3. The invention of claim 2, wherein the fiber attenuation budget is about 15 dB or greater.

4. The invention of claim 1, wherein the dynamic range of the receiver is 20 dB or greater.

5. The invention of claim 1, wherein at least one of the transmitter and receiver is a monolithic transceiver.

6. The invention of claim 5, wherein:
   (1) the transceiver is configured to transmit optical signals at a launch power level that takes into account the fiber attenuation budget of about 5 dB or greater; and
   (2) the transceiver has a receiver dynamic range that is selected based on the fiber attenuation budget.

7. The invention of claim 1, wherein the optical fiber is a mode-coupled plastic optical fiber.

8. The invention of claim 7, wherein the plastic optical fiber comprises a perfluorinated or substantially fluorinated plastic.

9. The invention of claim 7, wherein the plastic optical fiber comprises a protonated plastic.

10. The invention of claim 1, wherein the optical fiber is a mode-coupled glass optical fiber.

11. The invention of claim 1, wherein the optical fiber is a graded-index optical fiber.

12. The invention of claim 1, wherein the optical fiber is a step-index optical fiber.

13. The invention of claim 1, wherein the optical fiber has nonuniformities that contribute simultaneously to both the mode coupling and the attenuation level of the optical fiber in order to trade off power for bandwidth in the communications system.

14. The invention of claim 1, wherein:
   the launch power level of the transmitter is greater than $S(\lambda)-G(\lambda)$ and less than $S(\lambda)$;
   $\lambda$ is the wavelength (in nanometers) of light emitted by the transmitter;
   $G(\lambda)$ is approximately 6 dBm for 550 nm$<\lambda<$1200 nm, and $G(\lambda)$ is approximately 10 dBm for 1200nm$<80<$1400 nm; and
   $S(\lambda)$ is approximately:

$S(\lambda) = -6.5$ dBm    for $550\text{nm} < \lambda < 700$ nm;

$S(\lambda) = (-6.5 + 0.02(\lambda - 700))$ dBm    for $700\text{ nm} < \lambda < 1050\text{ nm}$;

$S(\lambda) = 0.44$ dBm    for $1050\text{ nm} < \lambda < 1150\text{ nm}$;

$S(\lambda) = (0.44 + 0.16(\lambda - 1150))$ dBm    for $1150\text{ nm} < \lambda < 1200\text{ nm}$; and $S(\lambda) = 9.47$ dBm    for $1200\text{ nm} < \lambda < 1400\text{ nm}$.

15. The invention of claim 1, wherein the optical fiber has a core diameter of less than about 150 microns.

16. The invention of claim 15, wherein the optical fiber has a core diameter of greater than about 50 microns.

17. The invention of claim 1, wherein the optical fiber has a core diameter of greater than about 50 microns.

18. The invention of claim 17, wherein the optical fiber has a core diameter of greater than about 62.5 microns.

19. The invention of claim 1, wherein the optical link is attenuation limited.

20. The invention of claim 19, wherein the optical link uses the mode-coupled optical fiber with a sufficiently high launch power to trade off power in return for greater bandwidth.

21. The invention of claim 1, wherein the receiver further comprises an integrated preamplifier.

22. The invention of claim 1, wherein the optical fiber is connected to the transmitter using a butt coupling.

23. The invention of claim 1, wherein the optical fiber is connected to the receiver using a butt coupling.

24. The invention of claim 1, wherein the optical fiber is capable of transmitting at a data rate as high as 12.5 Gb/s.

* * * * *

UNITED STATES PATENT AND TRADEMARK OFFICE
CERTIFICATE OF CORRECTION

PATENT NO.   : 6,476,951 B1
DATED        : November 5, 2002
INVENTOR(S)  : Whitney R. White It is certified that error appears in the above-identified patent and that said Letters Patent is hereby corrected as shown below:

Column 8,
Line 26, replace "< 80 <" with -- $< \lambda <$ --.

Signed and Sealed this

Fifteenth Day of April, 2003

JAMES E. ROGAN
*Director of the United States Patent and Trademark Office*